United States Patent [19]

Rowett

[11] Patent Number: 5,448,723
[45] Date of Patent: Sep. 5, 1995

[54] METHOD AND APPARATUS FOR FAULT TOLERANT CONNECTION OF A COMPUTING SYSTEM TO LOCAL AREA NETWORKS

[75] Inventor: Kevin J. Rowett, Cupertino, Calif.

[73] Assignee: Tandem Computers Incorporated, Cupertino, Calif.

[21] Appl. No.: 137,436

[22] Filed: Oct. 15, 1993

[51] Int. Cl.[6] ............................................. G06F 11/20
[52] U.S. Cl. ............................ 395/200.02; 364/285.3; 395/200.1; 395/180
[58] Field of Search ............... 395/575, 200; 364/285, 364/285.3, 240.2, 242.94

[56] References Cited

U.S. PATENT DOCUMENTS

| 4,228,496 | 10/1980 | Katzman et al. | 364/200 |
|---|---|---|---|
| 4,627,048 | 12/1986 | Larson | 370/60 |
| 5,034,966 | 7/1991 | Hochstein | 375/40 |
| 5,042,038 | 8/1991 | Proctor et al. | 371/68.1 |
| 5,056,090 | 10/1991 | Kubota | 371/8.2 |
| 5,084,816 | 1/1992 | Boese et al. | 395/575 |
| 5,091,847 | 2/1992 | Herbermann | 395/575 |
| 5,115,235 | 5/1992 | Oliver | 340/825.52 |
| 5,138,609 | 8/1992 | Hashimoto | 370/16 |
| 5,311,593 | 5/1994 | Carmi | 380/23 |

OTHER PUBLICATIONS

*Cable Redundancy for DNIs* by David MacNeill and Clyde W. Watson Cabletron Systems, Inc. Jul. 16, 1992).

*Computer Architecture and Organization Second Edition* by John P. Hayes ©1988 by McGraw-Hill, Inc. pp. 664-670.

*Modern Operating Systems* by Andrew S. Tanenbaum ©1992 by Prentice-Hall, Inc. pp. 414-418.

*Primary Examiner*—Vincent P. Canney
*Attorney, Agent, or Firm*—Townsend and Townsend Khourie and Crew

[57] ABSTRACT

A computing system, having an input/output bus for communicating data thereon, is connected to a network by a pair of network controller devices. Each of the network controller devices, in turn, connect to a corresponding one of a pair of multi-ported network repeater elements which are, in turn, connected to one another by a pair of network links. At least one workstation is connected to each of the network repeaters. One of the network controllers is initially selected as a primary data communicating path from the computing system to the network. The network controllers periodically transmit messages to one another, and if receipt of those messages by the primary network controller is noted, the selection of the primary controller will be switched to the other.

22 Claims, 3 Drawing Sheets

METHOD AND APPARATUS FOR FAULT TOLERANT CONNECTION OF A COMPUTING SYSTEM TO LOCAL AREA NETWORKS

BACKGROUND OF THE INVENTION

The present invention is related generally to computing system network configurations, and more particularly to a network configuration that is tolerant of faults that may occur.

Fault tolerant computing systems have long been known. In environments in which high availability of computing tasks are desired, computing systems have included various fault tolerant designs such as redundant parts, elements or modules, data checking and correcting schemes, and the like. An example of a fault tolerant computing system may be found in U.S. Pat. No. 4,228,496, which teaches a multi-processing system having fault tolerant capability for example in the form of redundant facilities to limit single points of failure.

One use of such high availability computing systems is as a "server" in various network configurations, such as, for example, local area network (LAN) designs. As a server, the computing system stores and maintains the various resources (e.g., application programs, data, etc.) used by the stations (e.g., personal computer (PC) systems) connected to the network. It was soon realized, however, that even though the server unit may be structured to provide high availability, the network itself limited that availability in that the network contained single points of failure. For example, cables can break, or inadvertently be removed, eliminating a communication path of the network and, more likely than not, isolating one or more stations from the server.

Solutions to this problem have included providing fully redundant networks. However, this solution has required the application programs to be extensively rewritten, thereby effectively eliminating the use of off-the-shelf application programs.

Thus, it is apparent that there is a need for extending the fault tolerant high availability provided by multiprocessor systems such as that of the aforementioned U.S. Pat. No. 4,228,496 to the network with which it may be used and connected. This extension of fault tolerance should be done in such a way so that applications run on workstations or the network need no, or little, revision or modification.

SUMMARY OF THE INVENTION

The present invention, is generally directed to a fault tolerant network configuration that provides high availability in a manner that does not require modification of the applications that may be run on the network. The invention, in a more specific aspect, provides a fault tolerant connection of a fault tolerant computing system to a network configuration, extending the fault tolerance of the computing system to the network.

According to the network configuration of the present invention, a computing system, preferably multiprocessor based like that taught by the aforementioned U.S. Pat. No. 4,228,496, includes a pair of network controllers coupled to the input/output (I/O) busses of at least one of the processor units of the system. The pair of network controllers, in turn, each connect to a corresponding one of a pair of multi-ported network access devices (preferably, a concentrator or star-wired repeater using the 10BASET wiring specification of IEEE Standard 802.3). Other stations connect to the network preferably by two network links, each connecting the station to one of the access devices, and the network access devices themselves are preferably communicatively connected to one another by a pair of network links.

The computing system (i.e., the server) to which the network controller pair connects will select one of the network controllers as a "primary" communication path to the network, designating the other network controller as a "backup." All communications between the computing system and the network are, therefore, communicated through the primary network controller so selected.

The two network controllers periodically send message packets (termed "heartbeat" messages) to one another, through the network, signalling each other that the sender, and connecting paths, are still in working order. Failure of one of the network controllers to receive a heartbeat message of the other will cause the computing system to mark that other controller as "unpaired" i.e., unavailable for use. If the unavailable network controller happens to be the selected primary network controller, the computing system will switch selection to designate the prior backup controller as the primary, and log the fact that the prior primary controller is no longer available.

Thus, these heartbeat messages perform two important functions: First, they operate to establish that each LAN controller 26, 28 is capable of transmitting and receiving message packets; and, second, they establish that the network is configured in a manner that allows the LAN controllers 26, 28 to function as a pair, one being primary, the other the backup.

The network configuration of the present invention provides a high availability networking system that can reconfigure itself in the face of a fault totally transparent to applications running on the network/workstation.

These and other aspects and advantages of the present invention will become evident to those skilled in the art upon a reading of the following detailed description of the invention, which should be taken in conjunction with the accompanying drawings.

DESCRIPTION OF THE PREFERRED EMBODIMENT

Figure 1:
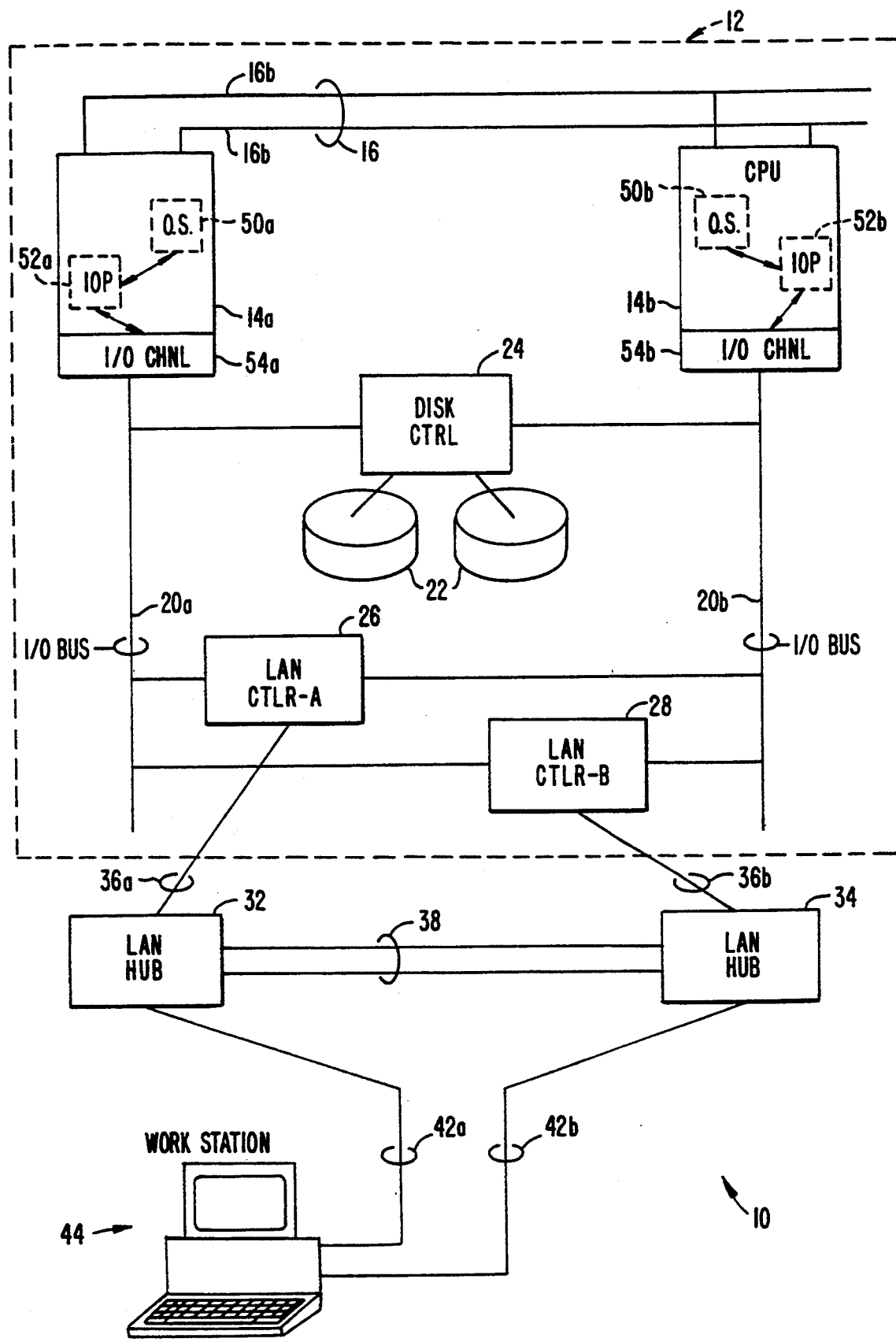
FIG. 1 is a block diagram illustration of a simplified network configuration structured according to the present invention.

Referring to the figures, and for the moment principally FIG. 1, there is illustrated in simplified form a preferred embodiment of the invention in a local area network (LAN) configuration. Designated with the reference numeral 10, the network so formed includes a computing system 12 operating as a network server for the network. The network shown implements an Ethernet protocol, although other network protocols (e.g., FDDI, token ring, etc.) can also be used. Communications carried on by the network 10 use, therefore, message packets as is conventional, and include the identification of the packet's originating station (source address), destination station (destination address) and such other information as may be provided for by the particular protocol used by the network.

Preferably, the computing system 12 is of a fault tolerant, multi-processor design, such as that illustrated in the aforementioned '496 patent, although those skilled in this art will recognize that a unitary processor system may also be used, except that it would present a single point of failure and therefore limit the fault tolerant capabilities of the overall system. As illustrated, the processing system 12 includes processor units 14 (14a, 14b). The processor units are connected to one another for interprocessor communications by an bus structure 16 (in the form of a pair of separate buses 16a, 16b). In addition, each processor unit 14 includes an input/output (I/O) bus 20 (20a, 20b) for each of the processors 14a, 14b, respectively.

Typically, particularly if operating as a server, the processing system 10 will include mass storage, for example, disk units 22, which are controlled by a dual-ported disk controller 24. The disk controller 24, in turn, is coupled to each of the I/O buses 20a, 20b.

Also connected to the I/O buses 20a, 20b are dual-ported LAN controllers 26, 28. In turn, the LAN network controllers 26, 28 respectively connect the processing system 12 to a pair of LAN access devices or 32, 34. An acceptable LAN controller is the 3615 LAN controller manufactured by the assignee herein, Tandem Computers Incorporated of Cupertino Calif. Such a LAN controller is what is termed an "intelligent" device in that it is a microprocessor-based machine.

As indicated, the LAN access devices 32, 34 are preferably each a pair of concentrators or star-wired repeater units using the 10BASET wiring. An acceptable access device is an ACCESS/ONE (a registered trademark of Ungermann-Bass Corporation) ASC 2000 cabinet containing two 10BASET concentrator cards (P/N ASM 32012), manufactured by Ungermann-Bass Corporation of Santa Clara, Califa. The LAN access devices are hereinafter referred to as LAN "hubs" 32, 34, although it will be evident to those skilled in this art that other types of media access devices (e.g., bridges) may also be used without departing from the teaching of the present invention.

Thus, the LAN controller 26 connects to one of the multiple ports of the LAN hub 32 via a link 36a, while the LAN controller 28 connects to the LAN hub 34 by a link 36b. A pair of the ports of each LAN hub 32, 36 (e.g., the backbone connection ports) communicatively connect the two LAN hubs 32, 34 to each other by links 38. Also, a port of each of the LAN hubs 32, 34 is connected by links 40a, 40b to a workstation 44.

Each of the LAN controllers 26, 28 are assigned three media access control (MAC) addresses. One address is unique to the specific controller. Message packets containing as a destination address this unique address will be received only by the identified LAN controller. The second address, a "pair-wise" address, identifies the pair of LAN controllers 26, 28 so that network message packets containing as the destination address such a pair-wise address will be received by the both LAN controllers 26, 28. The third address is a group MAC address. Message packets set to this group MAC address will be received by all units or stations of the group identified by the group MAC address, including the LAN controllers 26, 28 if they are assigned to that group.

Each processor unit 14 runs under an operating system (OS) 50 that has available an associated input/output process (IOP) device driver 52 through which communications between the processor unit 14 are handled (via an I/O channel 54 that forms the interface for the processor unit 14 to the I/O bus 20). The IOPs 52 handle communications through the LAN controllers 26, 28.

Each LAN controller will run the MAC layer protocol necessary to communicate with the LAN hubs 32, 34, and the network. The pair of LAN controllers 26, 28 will periodically send so-called "heartbeat" message packets to the group MAC address, which will be received by all other devices on the network, including the other LAN controller of the pair. Thus, for example, the LAN controller 26 will periodically send a heartbeat message packet that is received by its sibling LAN controller 28. The heartbeat message packet is an indication by one LAN controller to its sibling that it is still in operating condition and that its connection to the network 10 (and to the sibling LAN network controller) continues to exist. The LAN controllers 26, 28 will report the absence of any such heartbeat message packets to the IOP 52, allowing the IOP 52 to maintain a log, in the form of a software state machine (FIG. 2), of the status of the LAN controllers it controls.

The heartbeat message packets will contain, as a source address, the unique identification address of the LAN controller 26, 28 from which the packet originates. The receiving LAN controller will periodically report the receipt of heartbeat messages from its sibling, as well as reporting other LAN traffic. If a particular LAN controller (e.g., LAN controller 28) does not hear from its sibling (e.g., LAN controller 26), that absence of messaging is reported to the associated IOP 52. If the silent LAN controller was the designated primary, the associated IOP 52 will switch the designations. The LAN controller formally designated as the backup will now become the primary, and the former (but now silent) primary LAN controller will be designated as "unpaired," indicating that for some reason or other, it or its network connections are not functioning properly.

Since two processors 14 connect to the pair of LAN controllers 26, 28, they must decide among themselves who will control the LAN controllers, i.e., who will be the "primary" processor unit. The other becomes a backup, and will effect control only if the first becomes inoperative (see the '496 patent).

Then, the IOP 52 of the primary processor unit 14 will select one of the LAN controllers 26 (more or less on an arbitrary basis—at least at the outset) as the primary communication path between the processor unit 14 and the network 10. All communications between the processor unit 14 (under control of the IOP 52) will, therefore, be conducted through the selected "primary" LAN controller 26. The other of the pair of LAN controllers (e.g., LAN controller 28) operates as a backup. It may receive message packets from the network, but does not transmit those message packets on to the identified processor unit 14.

Figure 2:
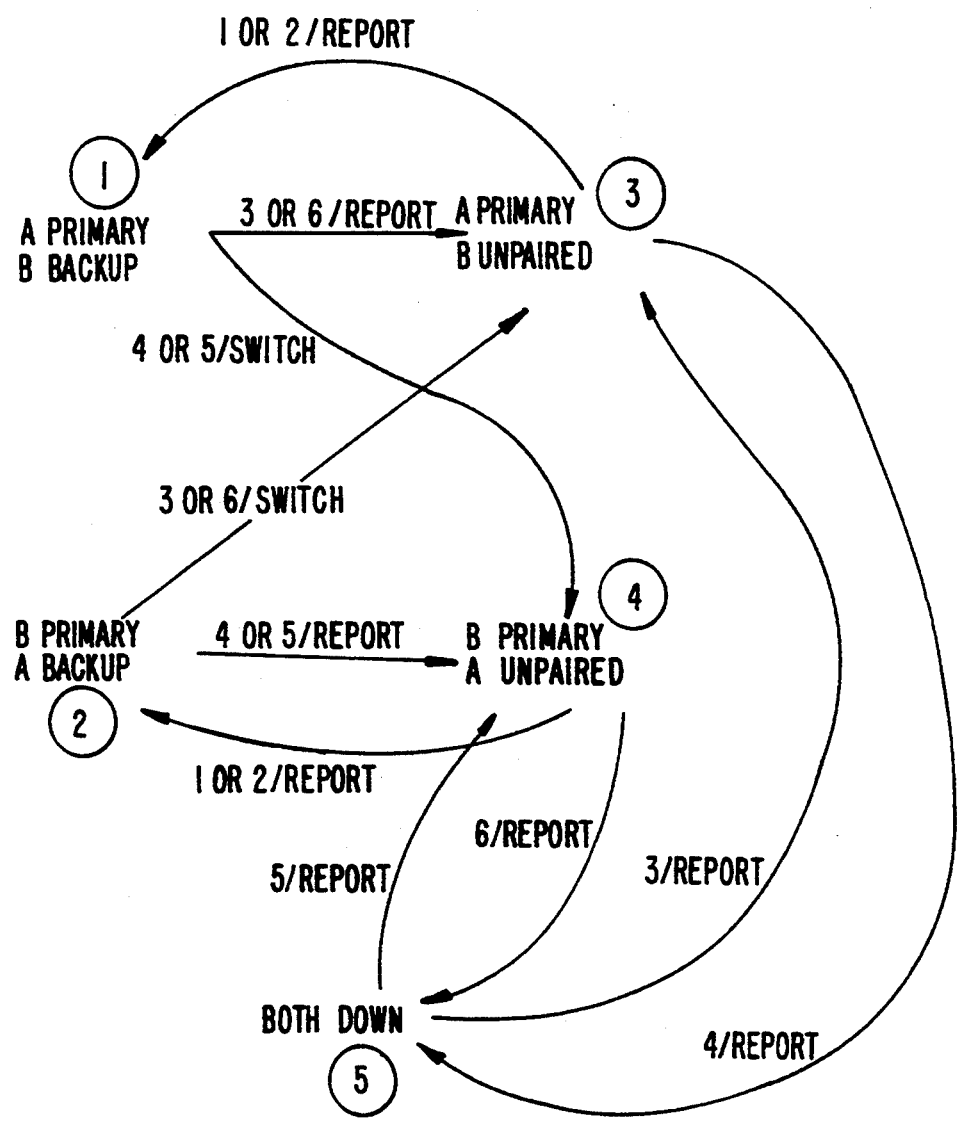
FIG. 2 is a state diagram maintained by the computing system of FIG. 1 to track the status of the network controllers that connect the computing system to the network.

The status of the LAN controllers 26, 28 as to which is primary, which is backup (i.e., available) is maintained in a software state machine by the IOP 52. The state diagram of that IOP-maintained state machine is illustrated in FIG. 2, showing the five separate states that identify the different status conditions that can be assumed by the pair of LAN controllers 26, 28 (i.e., which is primary, which is backup, and which is unavailable by the "unpaired" indication). The individual states are identified as follows:

1. Controller 26 is primary; controller 28 is backup.
2. Controller 26 is backup; controller 28 is primary.
3. Controller 26 is primary; controller 28 is unpaired.
4. Controller 26 is unpaired; controller 28 is primary.
5. Both down.

As indicated above, the term "unpaired" is meant to indicate that the LAN controller is unavailable as a backup. That unavailability may result from a malfunction of the controller itself, or by a missinglink connection such as, for example, link 36a in the case LAN controller 26.

A LAN controller 26, 28 selected as primary will be the one that the IOP will conduct all outgoing message packet traffic to for communication to the network 10, and will be the one that it will receive network message traffic from. The IOP 52 does not communicate with the network through the backup (or, obviously, the unpaired) LAN controller.

There are six different events that can occur to cause the IOP maintained state machine to change states. Those events are:

1. A heartbeat message that is reported to IOP 52 as being received by LAN controller 28, and sent by LAN controller 26. (In the tables, below, this is represented as "HB msg 26→28")
2. A heartbeat message is reported to the IOP 52 as being received by the LAN controller 26 and sent by the LAN controller 28 ("HB msg 28→26").
3. LAN controller 26 reports receiving MAC message packet traffic, but no heartbeat message packets from LAN controller 28 ("'26' rpts MAC").
4. LAN controller 28 reports receiving MAC message packet traffic, but no heartbeat message packets from LAN controller 26 ("'28' rpts MAC").
5. LAN controller 26 reports silence, i.e., no heartbeat or MAC message packet traffic is being received ("'26' rpts silence").
6. LAN controller 28 reports silence ("'28' rpts silence").

There are three actions that may be taken in the state machine as a result of the occurrence of an event as set forth above. Those actions are:

1. Switch (i.e., select the prior backup LAN controller as the primary).
2. Ignore the occurrence of the event.
3. Report the occurrence of the event.

The particular action taken, of course, depends upon the state of the IOP-maintained state machine. Tables 1-5, below, set forth for each of the six events that can occur, the action taken and, depending upon the event and the present state, the new state entered by the state machine. The left hand column of each table are the events; the center column identifies the action taken upon the occurrence of the event; and the right hand column of each table indicates the result of the action (i.e., remaining in the same state or changing to new state).

TABLE 1

| State (1). CTLR "26" primary; CTLR "28" Backup | | |
|---|---|---|
| Event | Action | New State |
| (1) HB msg 26→28 | (2) Ignore | (1) - Remain in Current State |
| (2) HB msg 28→26 | (2) Ignore | " |
| (3) "26" rpts MAC | (3) Report | (3) - 26 prim; 28 unpaired |
| (4) "28" rpts MAC | (1) Switch | (4) - 26 unpaired; 28 prim |
| (5) "26" rpts silence | (1) Switch | (4) - 26 unpaired; 28 prim |
| (6) "28" rpts silence | (3) Report | (3) - 26 prim; 28 unpaired |

TABLE 2

| State (2). CTLR "26" backup; CTLR "28" primary | | |
|---|---|---|
| Event | Action | New State |
| (1) HB msg 26→28 | (2) Ignore | |
| (2) HB msg 28→26 | (2) Ignore | |
| (3) "26" rpts MAC | (1) Switch | (3) - 26 prim; 28 unpaired |
| (4) "28" rpts MAC | (3) Report | (4) - 26 unpaired; 28 prim |
| (5) "26" rpts silence | (3) Report | (4) - 26 unpaired; 28 prim |
| (6) "28" rpts silence | (1) Switch | (3) - 26 prim; 28 unpaired |

TABLE 3

| State (3). CTRL "26" primary; CTRL "28" is unpaired | | |
|---|---|---|
| Event | Action | New State |
| (1) HB msg 26→28 | (3) Report | (1) - 26 prim; 28 backup |
| (2) HB msg 28→26 | (3) Report | (1) - 26 prim; 28 backup |
| (3) "26" rpts MAC | (2) Ignore | (3) |
| (4) "28" rpts MAC | (2) Ignore | (3) |
| (5) "26" rpts silence | (3) Report | (5) - Both Down |
| (6) "28" rpts silence | (2) Ignore | (3) |

TABLE 4

| State (4). CTL "26" unpaired; CTL "28" primary | | |
|---|---|---|
| Event | Action | New State |
| (1) HB msg 26→28 | (3) Report | (2) - 26 backup; 28 prim |
| (2) HB msg 28→26 | (3) Report | (2) - 26 backup; 28 prim |
| (3) "26" rpts MAC | (2) gnore | (4) |
| (4) "28" rpts MAC | (2) Ignore | (4) |
| (5) "26" rpts silence | (2) Ignore | (4) |
| (6) "28" rpts silence | (3) Report | (5) - Both Down |

TABLE 5

| State (5). Both Controllers Down | | |
|---|---|---|
| Event | Action | New State |
| (1) HB msg 26→28 | (3) Report | (1) - 26 prim; 28 backup |
| (2) HB msg 28→26 | (3) Report | (2) - 26 backup; 28 prim |
| (3) "26" rpts MAC | (3) Report | (3) - 26 prim; 28 unpaired |
| (4) "28" rpts MAC | (3) Report | (4) - 26 unpaired; 28 prim |
| (5) "26" rpts silence | (2) Ignore | (5) |
| (6) "28" rpts silence | (2) Ignore | (5) |

Thus, for example, table 1 illustrates the events that can occur while this state machine is in state 1: LAN controller 26 is selected as the primary, and LAN controller 8 is the backup. If event 1 (LAN controller 28 receives heartbeat message packets from LAN controller 26), the action is ignored (action 2) and the state machine remains in the state 1. However, assuming that we are still in state 1, and event 3 occurs (LAN controller 26 reports to the IOP that it is receiving only MAC message packets, no heartbeat message packets) this event indicates that LAN controller 28 may be unavailable for one or more of the reasons outlined above. Accordingly, the state machine moves from state 1 to state 3, in which LAN controller 26 remains the primary, but LAN controller 28 is now designated as "unpaired."

Continuing, and as a further example of the LAN controller status-keeping operation of the IOP-maintained state machine, refer now to table 3 which illustrates state 3 of the state diagram (FIG. 2): LAN controller 26 is still the primary data path between the processing system 12 and the LAN hubs 32, 34, but the LAN controller 28 is no longer a backup, and is designated unpaired. Assume now that either one of events 1 or 2 occur: LAN controller 28 begins reporting receipt of heartbeat message packets from LAN controller 26 (event 1), or LAN controller 26 reports receiving heartbeat messages from the LAN controller (B). Either occurrence indicates that the LAN controller 28 and/or its network connections are functioning properly. As Table 3 shows, the action taken by either of these occurrences is to report them to the controlling IOP 52, causing a change in state to state 1. (LAN controller 26 continues to be the primary connection to the network 10, but the status of the LAN controller 28 changes from unpaired to backup.) The remaining events of any of the tables 1-5 can be similarly interpreted, with reference to the six events that are identified above that can occur, and the actions that are taken as a result of the occurrence of those events, depending upon the particular state of the state machine.

Note that as a result of the continuous status tracking capability provided by IOP-maintained state machine, the IOP 52 is able to reconfigure which LAN controller 26, 28 will be the primary connection to the network 10, and which will be backup as situations change. And, as will become evident below, this is all done in a manner that is transparent to the rest of the network. For example, assume that after initial selection of the LAN controller 26 and the primary, and LAN controller 28 the backup, the controlling IOP 52 notes that either LAN controller 28 begins reporting receipt of only MAC message packet traffic (i.e., no heartbeat message packets are being received from LAN controller 28-occurrence 4), or the LAN controller 26 reports silence (occurrence 5). As the state diagram (FIG. 2) and Table 1 indicate, either of these occurrences will cause the state machine to move from state 1 to state 4 in which LAN controller 26 is designated as unpaired, and LAN controller 28 now becomes the primary connection to the network 10. The IOP 52 will see to it that all further communications with the network 10 are conducted through the LAN controller 28.

The transparency of this change in network connection results from the pair-wise addresses used by the LAN controllers 26, 28. All message packets directed to the processing system 12 will use this pair-wise address which, as explained above, is the same for both LAN controllers. Thus, when the workstation 44 sends a message packet to the computing system 12, the destination address in that packet will identify both the LAN controllers 26, 28, and both will receive that packet. Only the LAN controller 26, 28 designated as the primary will forward that message packet on to the processor unit 14 (i.e., the IOP 52 running on the Processor 14). Thus, the computing system 12 was able to reconfigure itself to account for a fault occurring somewhere in its prior primary connection to the network 10 without assistance from, or even the knowledge of, the other stations on the network (e.g., workstation 44).

The LAN hub units 32, 34 are preferably designed to implement IEEE Standard 802.1 and, in particular, the "Spanning Tree and Learning Bridge Algorithm" described by that Standard. This algorithm gives the LAN hub units 32, 34 the capability of learning the configuration of the network and the location of the stations on the network, including the LAN controllers 26, 28, by the traffic to and from those stations. LAN hubs 32, 34 will begin recognizing message packet traffic to and from the LAN controller 28 and will reconfigure itself to forward the traffic for the processing system 12 to that LAN controller.

In addition, the preferred embodiment of the invention utilizes two links 38 to interconnect the LAN hub 32, 34 themselves. The Spanning Tree and Learning Bridge Algorithm described in IEEE Standard 802.1 will select as a primary a one of the two links 38, reserving the other as the backup. Should the primary fail, the algorithm will then select the backup.

Figure 3:
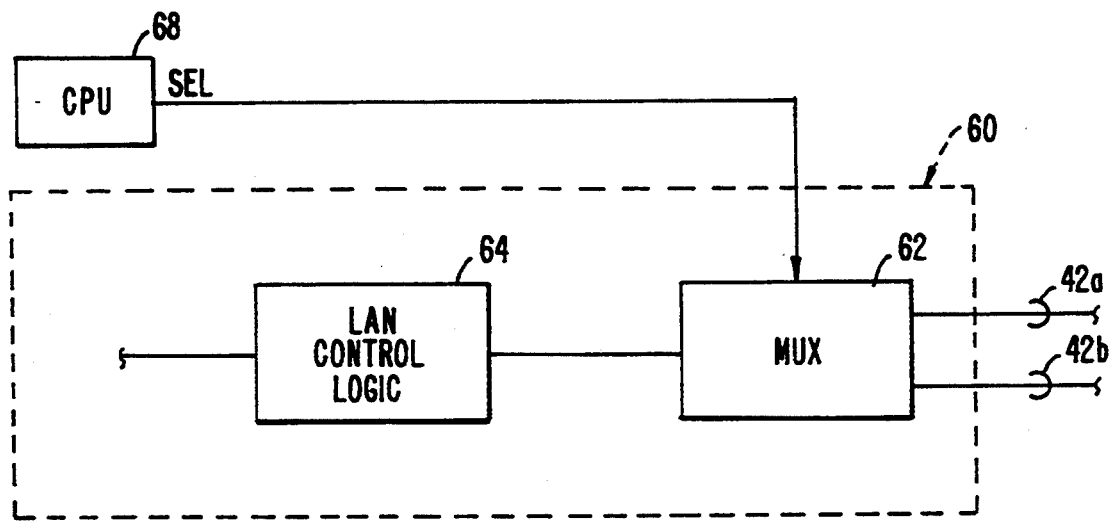
FIG. 3 is a simplified block diagram showing the interface elements: used to connect the workstation shown in FIG. 1 to the actress devices.

The fault tolerant philosophy incorporated in the present invention is extended to the connection of the workstation 44 to the network 10 by means of the connection of the workstation 44 to each of the two LAN hubs 32, 34, providing an alternate communication path should one go down. The interface for the dual-link connection of the work station 44 to the network 10 is illustrated in FIG. 3 and designated with the reference numeral 60. As shown, the network interface 60 includes a multiplexer (MUX) 62 and conventional LAN control logic 64. In actual implementation the MUX 62 is an electro-mechanical relay, operating to select one of the two network links 42 to which it connects to the LAN control logic 64. The MUX 62 operates under control of a select (SEL) signal from the central processing unit (CPU) of the workstation 44. The selected link 42 becomes the "primary" communication link for the workstation 44 to the network 10.

The LAN control logic 64 is a conventional network controller chip, such as the Ultrachip Ethernet controller, and sold under the part number 83C790QF, manufactured by and available from Standard Microsystems Corporation of Hauppauge, New York. Such network controller devices typically include pulse detection circuitry to monitor the LAN link to which the device is attached to determine the integrity of the link. As is conventional, the LAN hubs 32, 34 are designed to periodically transmit link integrity pulses from each of its ports when there is no message packet traffic. The link integrity pulses provide an indication that the link itself (and the port connecting to the link) is in good order. Absence of any such link integrity pulses will cause the LAN control logic 64 to report that absence to the CPU 68.

Preferably, the port connections of the network interface 60 to the network links 42 are also 10BASET type wiring connections, although the conventional AUI connections may also be used. The 10BASET wiring connection is preferred because it provides a quicker report time for missing link integrity pulses.

Initially, the CPU 68 will select one of the links 42 as the primary link, and communicate that link to the LAN control logic 64 through the MUX 62. Thereafter, all traffic between the workstation 44 and the network 10 will be across only the selected link 42 (e.g., 42a). As indicated above, the CPU 68 will periodically receive reports concerning the integrity of the primary link from the LAN control logic 64, as determined from the receipt (or absence of) link integrity pulses from the LAN hubs 32, 34. If the report identifies the primary link, the CPU 68 will switch the MUX 62 to communicate the link 42 that was formally the backup to the LAN control logic 64.

The link initially not selected as the primary (e.g., 42b) is termed the backup link. Periodically (e.g., every one-half second) the CPU and will select the backup link 42b and communicate it to the LAN control logic 64 to determine if that link is communicating the link integrity pulses transmitted by the LAN hub 34 (FIG. 1). If not link integrity pulses are reported to the CPU 68 as absent, the CPU 68 determines that for some reason the link 42b is unavailable.

Figure 4:
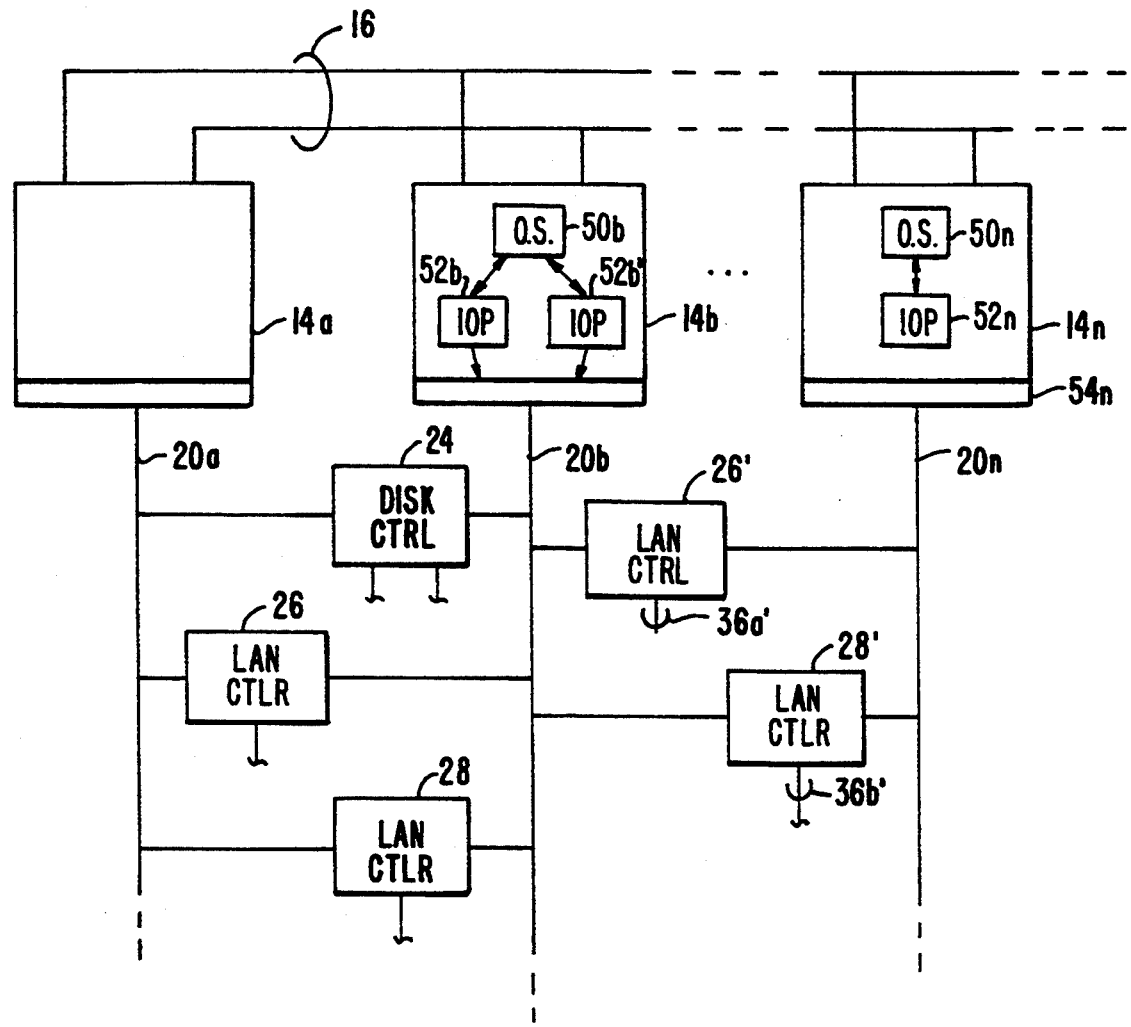
FIG. 4 is a block diagram illustrating use of the invention in a more complex computing system.

Returning for a moment to FIG. 1, and noting that the LAN controllers 26, 28 are connected to two processor units 14, it will be appreciated that each processor unit 14 has an IOP 52 for each pair LAN controllers 26, 28. If a processor unit 14 was connected to an additional pair, and additional IOP 52 would be necessary. This is illustrated in FIG. 4, which shows the processing system 12 as a more generalized multi processing system having up to N processors. In the context of the multi processors system of the '496 patent N is preferably limited to 16.

Thus, as FIG. 4 illustrates, in addition to the processor units 14a and 14b there is also processor unit 14n, and additional LAN controller pair 26', 28' prime are connected between the I/O and buses 20b, 20n of the processors 14b, 14n. The LAN controllers 26', 28' prime are connected, by network links 34a, 34b to the LAN hub devices 32, 34, respectively in the same manner that LAN controllers 26, 28 are connected.

The processor unit 14n runs under an operating system (O.S.) 50n, with the input/output process (IOP) device driver 52n for operating the LAN controllers 26', 28', (through the I/O channel 54n of the processor unit 14n. Now, however, the processor unit 14b has two separate IOP device drivers: an IOP 52b for controlling input/output communication with the network 10 through the LAN controllers 26, 28, and a separate IOP device driver 52b' prime for controlling communication through the second LAN controller pair 26', 28'.

It will be apparent to those skilled in this art that although the invention has been discussed in terms of a single workstation 44, in reality there would be a number of stations of various types. Preferable each of those stations would also be connected to the LAN hubs 23, 34 in the same manner as is shown for workstation 44, i.e., be separate link connections. Further, although it would be preferable that the invention be implemented with a processing system 14 as described (with each pair of LAN controllers 26, 28 connected between two processor units 14), a computing system 14 could eschew the fault tolerant capability provided by a multiprocessor system and have only a single I/O bus to which single-ported LAN controllers connect the processor to the network. Although the single processor presents a single point of failure, the connection to the network through a pair of LAN controllers and the configuration of the network itself of the present invention still provides a fault tolerant network design.

In addition, although the preferred embodiment of the invention is to use "intelligent" LAN controllers to interconnect the computing system 12 to the network 10, that need not necessarily be the case. It will be recognized by those skilled in this art that many of the operations that would be performed by such intelligence of the LAN controller could be handled by the IOP running on the computing system, although at the cost of computing time of the computing system.

What is claimed is:

1. A method for fault tolerant connection of a processing means to a network, the processing means having an input/output bus means for communicating data, the method comprising the steps of:
    connecting to the input/output bus means first and second network controller means;
    providing a pair of hub means each having a plurality of ports at which data is received or transmitted, a one of the plurality ports of each of the pair of hub means being coupled to corresponding ones of the first and second network controller means for receiving data therefrom or transmitting data thereto, another of the plurality of ports of a one of the pair of hub means being coupled to another of the plurality of ports of the other one of the pair of hub means;
    connecting at least one station means to another one of the plurality of ports of each of the pair of hub means; and
    selecting a one of the first or second network controller means as a primary data communication path between the processing means and the pair of hub means.

2. The method of claim 1, including the step of transmitting from the first and second network controller means for receipt by at least the second and first network controller means, respectively, message data.

3. The method of claim 2, wherein the transmitting step occurs periodically.

4. The method of claim 3, wherein the absence of receipt of the message data from the first or second controller means by the second or first controller means, respectively, is reported to the processor means.

5. The method of claim 4, including the step of selecting another of the first or second network controller means as a primary data communication path when absence of receipt of the message data from the prior selected one of the first or second network controller means is reported to the processor means.

6. The method of claim 1, wherein a further pair of the plurality of ports of each of the hub means is coupled to the other to form a corresponding pair of hub-to-hub connections for communicating data therebetween, and including the step of selecting a one of the pair of hub-to-hub connections as a primary data communicating path between the pair of hub means.

7. A fault tolerant connection of a processing system to a network, the processing system having an input/output bus means for communicating data, the connection comprising:
    first and second network controller means connected to the input/output bus means;
    a pair of forwarding means each having a plurality of ports at which data is received or transmitted, a one of the plurality ports of each of the pair of forwarding means being coupled to corresponding ones of the first and second network controller means for communicating data therebetween, another of the plurality of ports of a one of the pair of forwarding means being coupled to another of the plurality of ports of the other one of the pair of forwarding means;
    at least one station means connected to a port of each of the pair of forwarding means; and
    means for selecting a one of the first or second network controller means as a primary data communication path from the processing means to the pair of forwarding means.

8. The fault tolerant connection of claim 7, the one station means including means for selecting a connection to a one of the ports of each of the pair of forwarding means as a primary path for data communication to and from the one station means.

9. The fault tolerant connection of claim 7, including means for causing the first and second network controller means to transmit message data to be received by at least the second and first network controller means, respectively.

10. The fault tolerant connection of claim 9, wherein the first and second network controller means report absence of receipt of message data to the processing means, and wherein the processing means selects another of the first or second network controller means as a primary data communication path when absence of receipt of the message data from the prior selected one of the first or second network controller means is reported to the processor means.

11. The fault tolerant connection of claim 7, wherein the first and second network controller means periodically transmit message data for receipt by the second and first network controller means, respectively, and wherein absence of receipt of message data by the first or second network controller means selected as the primary communications path results in selection of another of the first or second network controller means as the primary data communication path.

12. The fault tolerant connection of claim 7, including a peripheral device and a peripheral controller means connecting the peripheral device to the input/output bus means.

13. The fault tolerant connection of claim 12, wherein the peripheral device is a data storage means.

14. A method of coupling a computing system to a data communicating network, the computing system having at least a pair of processor units each having an input/output bus for communicating data thereon;
   providing at least a pair of network control devices each coupled to the input/output bus of the pair of processor units;
   providing a pair of access devices each having multiple data ports for communicating data;
   coupling a one of the pair of network control devices to a one of the multiple data ports of a corresponding one of the pair of access devices, and coupling the other of the pair of network control devices to a one of the multiple data ports of the other of the pair of access devices;
   connecting each of the access devices to the data communicating network for communicating data therebetween; and
   selecting one of the pair of network control devices for data communication between the computing system and the data communicating network.

15. The method of claim 14, including the step of selecting one of the pair of access devices for data communication with the data communicating network.

16. The method of claim 15, including the steps of providing a pair of communication paths between the pair of access devices, and selecting one of the communication paths for communicating data between the pair of access devices.

17. The method of claim 14, wherein data is communicated by the data communicating network using a message containing a destination address indicative of a recipient of the message, and including the step of providing each of the pair of network control devices with an address that identifies both of the pair of network controllers as the recipient the message containing the address as the destination address.

18. The method of claim 14, including the step of each of the pair of network control devices sending a periodic message to the other of the pair of network control devices.

19. The method of claim 18, wherein the sending step is for at least the purpose of identifying to the other of the pair of network control devices that each of the pair of network control devices continues to operate.

20. The method of claim 18, including the step of the other of the pair of network control devices reporting failure to receive the periodic message to the computing system.

21. The method of claim 18, including the steps of selecting a one of the pair of network control devices to communicate data between the computing system and the pair of access devices, and selecting the other one of the pair of network control devices in absence of the periodic message from the one of the pair of network control devices.

22. A fault tolerant connection between a computing system and a network that includes at least one data communicating station, the computing system having an input/output bus for communicating data, the fault tolerant connection comprising:
   first and second network control devices each coupled to the input/output bus for communicating data therewith, each of the first and second network control devices operating to periodically communicate a message to the other of the first and second network control devices, and to report to the computing system failure to receive the message;
   a first network access device communicatively coupled to the first network control device, and a second network access device communicatively coupled to the second network control device;
   at least a pair of data communication paths coupled between the first and second network access devices, a one of the pair of communication paths being selected for communicating data between the first and second network access devices; and
   a pair of data paths each respectively coupling the first and second access devices to the data communicating station, the data communicating station including a multiplex circuit operating to select one of the access devices for data communication.

* * * * *